INVENTORS.
ROBERT A. FROSCH
CLARENCE S. CLAY, JR.
BY Philip Schneider
Louis B. Appleman
ATTORNEYS

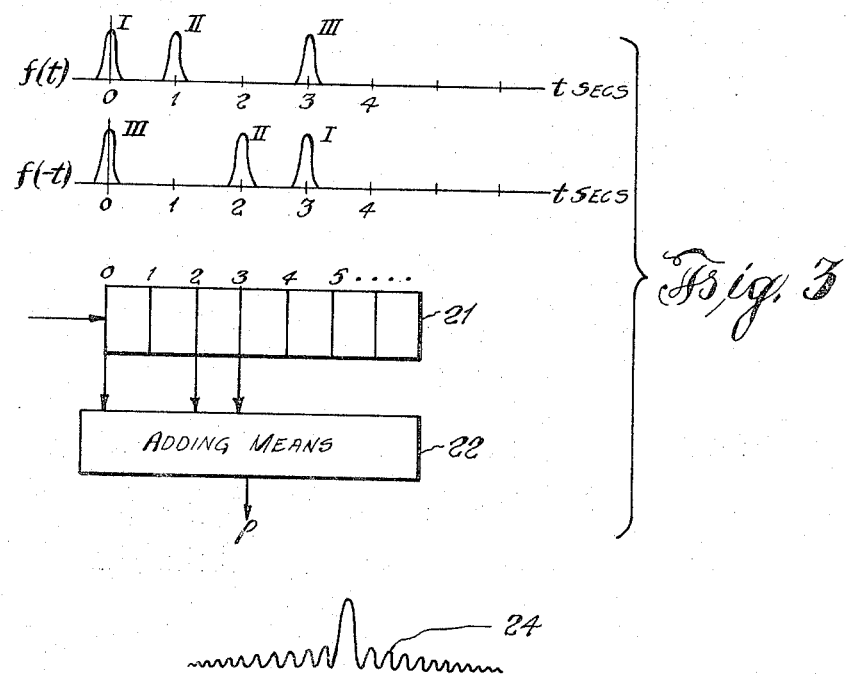
Fig. 3
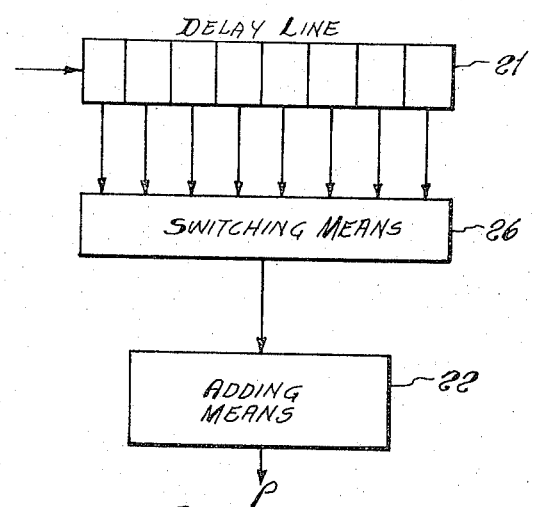
Fig. 4
Fig. 5
INVENTORS.
ROBERT A. FROSCH
CLARENCE S. CLAY, JR.
BY Philip Schneider
Louis B. Applebaum
ATTORNEYS INVENTORS.
ROBERT A. FROSCH
CLARENCE S. CLAY, JR.
BY Philip Schneider
Louis B. Appleban

United States Patent Office 3,307,190
Patented Feb. 28, 1967

3,307,190
DIRECTIONAL FILTERING OF SUMMED ARRAYS
Clarence S. Clay, Jr., Hastings on Hudson, N.Y., and Robert A. Frosch, Alexandria, Va., assignors to the United States of America as represented by the Secretary of the Navy
Filed Oct. 28, 1963, Ser. No. 319,624
9 Claims. (Cl. 343—100)

This invention relates to the maximization of signal output by means of matched-filter technique and particularly to a method and means for the maximization of the signal output of an antenna array for a specific direction.

In the radar and sonar arts, signals are often received by huge multi-element antenna arrays which are "steered" electronically. The signal from each array element must be kept separate from all the others so that the correct amount of delay can be applied to each signal for each beam direction. This demands the running of a signal cable from each array element to the electronic signal-processing equipment which may be located at a considerable distance from the array site. It would be much more convenient if the signals from the array elements were to be added at the site of the array and the summed signal sent to the signal-processing equipment over a single cable. In the case of sonar equipment where underseas cables must be employed, a considerable savings could be effected in original cost and maintenance as well as an increase in the reliability of operation of the equipment, since underseas cables are expensive and subject to frequent breakdowns as a result of leakage and salt-water corrosion.

The present invention utilizes only a single cable from an antenna array to the signal-processing equipment and yet permits the antenna array to be steered. This is accomplished by summing the individual element signals at the array and processing the summed signal through a filter which is "matched" to the summed signal.

An object of the invention is to provide means to determine the directivity of an antenna array after the output signals from the various array elements have been summed.

Another object is to provide means to enable the outputs of the elements of an antenna array to be sent to the signal-processing equipment over a single pair of wires and yet to be able to utilize the combined signal to steer the array.

A further object is to reduce the cost and complexity and improve the reliability of the equipment and the connectors employed to steer an antenna array.

Other objects and many of the attendant advantages of this invention will be readily appreciated as the same becomes better understood by reference to the following detailed description when considered in connection with the accompanying drawings wherein:

FIG. 3 is a schematic diagram illustrating the meaning of a matched signal and how it may be obtained in practice;

FIG. 4 is an illustration of a typical correlation signal;

FIG. 5 is a schematic diagram showing the addition of switching means so that the array can be steered for various spatial locations;

Figure 2:
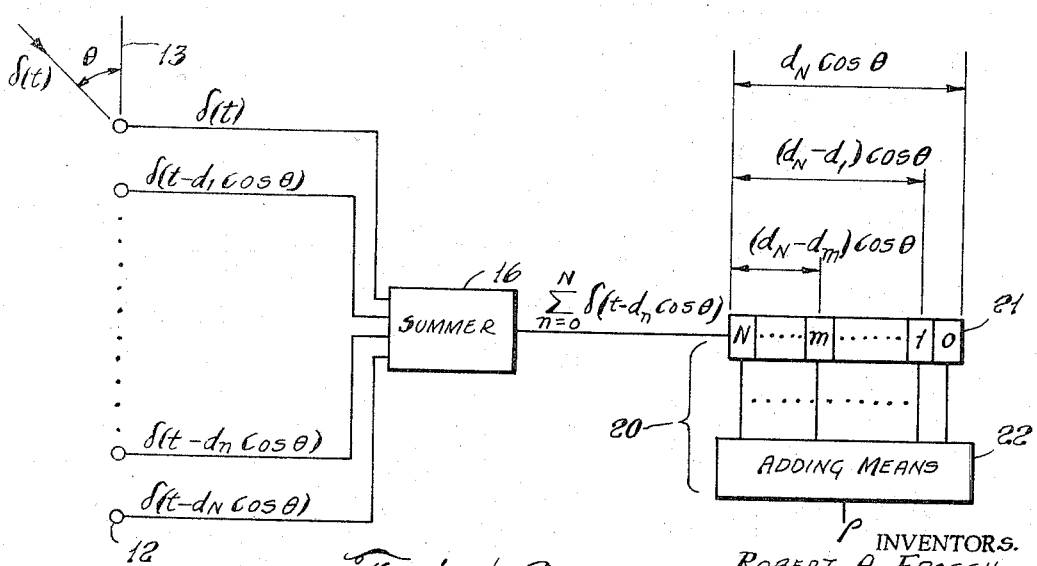
FIG. 2 is a schematic illustration of an embodiment of the invention.
Figure 6:
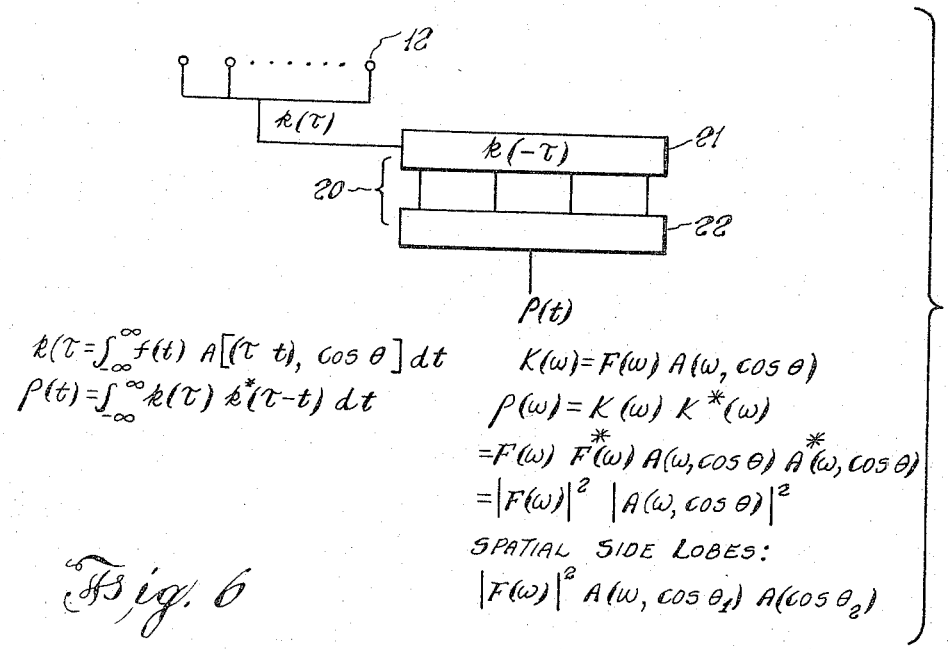
Figure 7:
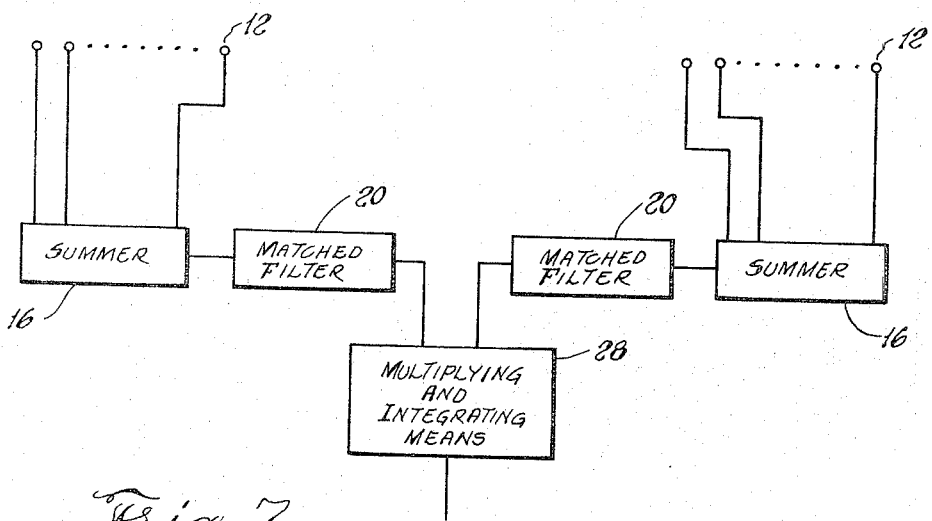

FIG. 6 indicates the mathematics which is involved in the embodiment shown in FIG. 2; and FIG. 7 is a schematic diagram of a second embodiment of the invention which is applicable to unknown signals.

Figure 1:
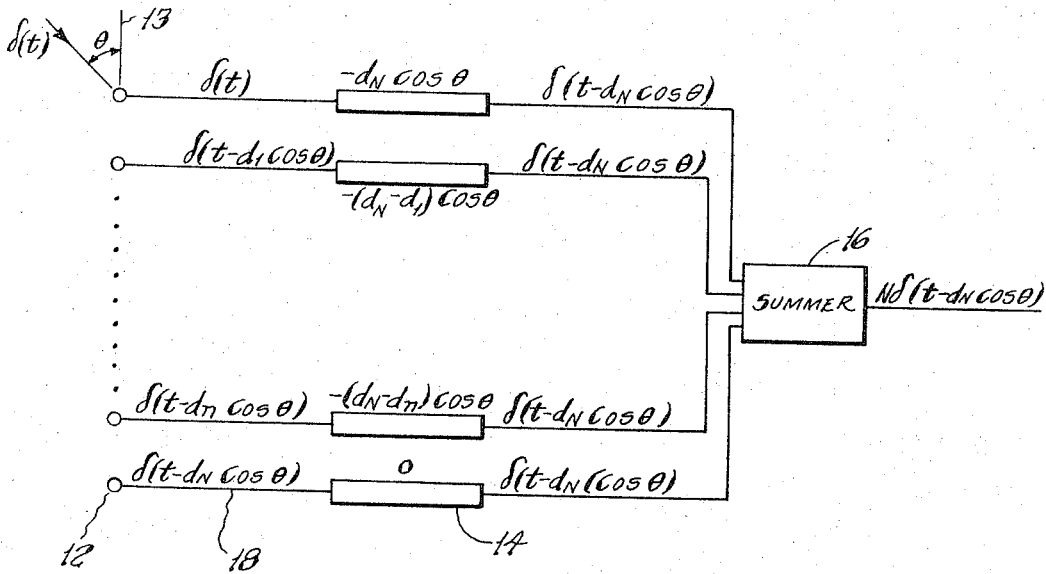
FIG. 1 is a schematic illustration of a conventional method for electronic steering of an antenna array.

A conventional method of steering an antenna array, such as a hydrophone array used in underwater sonar detection applications, is shown in FIG. 1.

Consider a plane wave Dirac $\delta$ function (an impulse) incident on a linear array. If time is measured from the incidence of the wave at one end of the array (topmost hydrophone in FIG. 1), the $n^{th}$ hydrophone will receive a signal $\delta(t-d_n \cos \theta)$, where $d_n$ is the distance of the $n^{th}$ hydrophone from the end of the array divided by the speed of sound in the medium, and $\theta$ is the angle of the normal to the wave front (i.e., the direction of wave propagation) with the line of the array 13. If an appropriate delay line 14 is connected to each hydrophone amplifier 12 and the outputs are summed in a summer 16, the $\delta$ function may be recovered with amplitude N and the time delay $d_n \cos \theta$. If the delay is for the direction $\theta_2$ while the signal comes from direction $\theta_1$, there are side-lobe levels which are given by $$\sum_{n=0}^{N} \delta[t-d_N \cos \theta_1 - (d_N - d_n \cos \theta_2)]$$

The signal wires 18 from the hydrophone units 12 go to the delay lines 14 which are usually located on shore at a considerable distance from the underwater hydrophones. This means that expensive submarine cables must be employed. It would be a great advantage if all the hydrophone output signals could be brought to shore over a single cable. An embodiment for accomplishing this result is shown in FIG. 2.

If the hydrophone outputs are added first in summer 16, which is located at the antenna array site, the summer output is a sequence of $\delta$ functions whose spacing is characteristic of the incoming direction of the wavefront, the hydrophone spacings (in time) themselves corresponding to end-fire incidence, while a single $\delta$ function (zero spacing) corresponds to broadside incidence. By passing the output of the summer 16 through a matched filter 20, which may, for example, comprise a single delay line 21 with appropriate taps plus adding means 22, or may comprise a shift-register delay line, a function may be recovered which consists of the same function as is recovered in the usual method shown in FIG. 1, with the addition of $\delta$ functions occurring at other times (the same is true of the side lobes). The expression for the output function, $\rho$, which consists of a main lobe and side lobes, is:

$$\rho = \sum_{m=0}^{N} \sum_{n=0}^{N} \delta[t-d_n \cos \theta - (d_N - d_m) \cos \theta]$$

$$\rho = N\delta(\tau - d_N \cos \theta) + \sum_{m=0}^{N} \sum_{n=0}^{N} \delta[t-d_N \cos \theta + (d_m - d_n) \cos \theta]$$

If the array elements are spaced so that all the $(d_m - d_n)$ factors are distinct, the main lobe will be N times the side lobes in the time domain. The main lobe will have an amplitude N with temporal side lobes of amplitude 1 in the matched filter case (the main lobe also has an amplitude N for the apparatus shown in FIG. 1.)

A slight digression upon the theory of matched filters may be in order at this point. Briefly, a filter is said to be matched to a signal $f(t)$ if the impulse response of the filter is $f(-t)$. The output of the matched filter is then the autocorrelation of the signal. If the input signal is a series of pulses as shown in FIG. 3, i.e., $f(t)$, $f(-t)$ will be the input pulses reversed in time (time in this diagram is considered to be in units of 1 second). The output connections for a delay line 21 comprising a filter matched to the input signal would be three leads at the 0, 2 and 3-second delay points of the line. The output signal, $\rho$, would be a series of six pulses at 1-second intervals, the first two and the last pulses having half the amplitude of the third, fourth and fifth pulses. With an input signal consisting of a greater number of pulses, as is encountered in practice in undersea sonar work, the output signal would tend to have a sharp increase in amplitude at its center as can be seen in FIG. 4, which is a typical autocorrelation signal 24. This peak indicates the presence of received input signals other than pure noise.

For a given set of filter taps, the output autocorrelation signal $\rho$ is a maximum in only one specific direction (which would be the beam direction). Different sets of delay-line taps are required for other directions. Thus, to steer an antenna array, it is necessary to feed the delay-line outputs in various appropriate arrangements to switching means 26 such as a multiposition switch which can then be rotated to obtain outputs corresponding to different spatial locations. This is indicated in FIG. 5.

FIG. 6 indicates the mathematics involved in the invention. If a time-varying, plane wave signal $f(t)$ impinges at an angle $\theta$ on a summed linear array, and the array impulses response function is $A(t, \cos \theta)$, the output $k(\tau)$ is the convolution function of the input and the response, that is $$k(\tau) = \int_{-\infty}^{\infty} f(t) A[(\tau - t), \cos \theta] dt$$

for which the frequency transform would be $$K(\omega) = F(\omega) A(\omega, \cos \theta)$$

The output $\rho(t)$ of the matched filter 20 would then be an autocorrelation function, or $$\rho(t) = \int_{-\infty}^{\infty} k(\tau) k^*[(\tau - t)] d\tau$$

for which the frequency transform would be $$K(\omega) K^*(\omega) = F(\omega) F^*(\omega) A(\omega, \cos \theta) A^*(\omega, \cos \theta)$$
$$= |F(\omega)|^2 |A(\omega, \cos \theta)|^2$$

and the spatial side lobes in frequency transform terms would be $$|F(\omega)|^2 A(\omega, \cos \theta_1) A(\cos \theta_2)$$

The asterisk symbol signifies that the complex conjugate of the function must be employed. Reasonable care in the design of the array will produce a correlation function pattern with a high, narrow main peak and small side lobes.

It should be noted that the invention works best with fairly broadband, highly peaked input signals which is the type of return signal to be expected when a sonar pulse is reflected from a target over an underwater path, for example.

Another embodiment of the invention is shown in FIG. 7. Here, there are two summed linear arrays, each feeding its output signal to its respective matched filter 20. However, each matched filter is matched to its array impulse response function rather than to the input signal to its array. The outputs of the matched filters are then cross correlated by being fed into multiplying and integrating means 28. This gives the effect of convolving the autocorrelation of the array input signal time function with the cross correlation of the array auto-correlation time functions. This embodiment has the capability of being applicable to unknown input signals since the filter characteristics do not have to be matched to the summed output signal of the linear array which is related to the input signal to the array.

Of course, this embodiment also looks in one specific direction for a given arrangement of output connections from the matched-filter delay lines. As before, switching means would have to be included to enable the antenna arrays to be steered over many directions.

Obviously many modifications and variations of the present invention are possible in the light of the above teachings. It is therefore to be understood that within the scope of the appended claims the invention may be practiced otherwise than as specifically described.

We claim:

1. A method for steering a multi-element antenna array in a number of specific directions comprising the steps of:
   adding the outputs of the individual antenna elements to produce a single summed signal;
   applying the summed signal to a filter which is tapped to provide a sequence of increasingly delayed outputs;
   arranging the tapped outputs of said filter in appropriate sets, each set providing an optimum output when the filter is matched to a different summed signal, each of said summed signals being derived from an input wave to the antenna which arrives from a different one of said specific directions; and
   applying each of said filter-output-signal sets to switching means so that any one of the sets may be selected as desired, thereby steering said array in the direction associated with the selected set.

2. Apparatus for steering a multi-element array in a specific direction comprising, in combination with a multi-element antenna array;
   summing means, to which each element of said array is connected, for adding the outputs of said elements; and
   filter means connected to receive the output of said summing means, said filter means being matched to the output signal of said summing means for a signal impinging upon said array from a specific direction.

3. Apparatus as set forth in claim 2, wherein said matched filter means comprises:
   delay means which is tapped to provide a sequence of increasingly delayed outputs, specific connections being provided to that set of taps which matches said filter means to the output signal of said summing means for a specific antenna array direction; and
   summing means connected to receive the outputs of said set of taps to which said specific connections are made.

4. Apparatus for steering a multi-element antenna array in a number of specific directions comprising, in combination with a multi-element antenna array:
   summing means, to which each element of said array is connected, for adding the outputs of said elements; and
   matched filter means comprising
      delay means connected to said summing means, said delay means having tapped sections which provide as an output the input signal to said delay means with increasing amounts of delay,
      connections to said tapped sections of said delay means, said connections being arranged in appropriate sets, each set providing signals which, when added, match the response function of said filter means to the output of said summing means for a signal wave impinging on said antenna array from a different one of said specific directions,
      selective switching means receiving said tapped-section connections as inputs, said switching means permitting the selection of any one of said tapped-section connection sets as desired, and
      summing means connected to receive the output of said selective switching means.

5. A method for steering a pair of multi-element antenna arrays in a specific direction comprising the steps of:
   adding the outputs of the individual antenna elements of the first array to produce a single summed signal;

applying said summed signal to a filter which is matched to the impulse response characteristic of the antenna array for a signal impinging upon said array from a specific direction and deriving an output from said matched filter;

performing the same steps for the second antenna array elements;

multiplying the output of one said matched filter with that of the other to obtain a product signal; and integrating the product signal.

6. A method for steering a pair of multi-element antenna arrays in any one of a number of selectable directions comprising the steps of:

adding the outputs of the individual antenna elements of the first array to produce a single summed signal;

applying the summed signal to a filter which is tapped to provide a sequence of increasingly delayed outputs;

arranging the tapped outputs of said filter in appropriate sets, each set providing an optimum output when the filter is matched to the impulse response characteristic of the antenna array for a signal impinging thereon from a different one of said selectable directions;

applying each of said filter-output-signal sets to switching means so that any one of the sets may be selected as desired;

performing the same set of steps for the elements of the second antenna array;

deriving the outputs of the two switching means and multiplying them to obtain a product signal; and integrating the product signal.

7. Apparatus for steering a pair of multi-element antenna arrays comprising, in combination:

a first antenna array comprising a plurality of transducer elements;

summing means, to which each element of said array is connected, for adding the outputs of said transducer elements;

filter means connected to receive the output of said summing means, said filter means being matched to the impulse response characteristic of the antenna array for a signal impinging upon said array from a specific direction;

a second antenna array, summing means and filter means identical to the first; and multiplying and integrating means connected to receive as inputs the outputs of said first and second filter means, said filter-means outputs being multiplied and integrated therein to provide a maximum output for one specific beam direction of said antenna arrays.

8. Apparatus as set forth in claim 7, wherein each said matched filter means comprises:

delay means which is tapped to provide a sequence of increasingly delayed outputs, specific connections being provided to that set of taps which matches said filter means to the impulse response characteristic of the antenna array for a specific antenna array direction; and summing means connected to receive the outputs of said set of taps to which said specific connections are made.

9. Apparatus for steering a pair of multi-element arrays in any one of a number of selectable directions comprising, in combination:

a first antenna array comprising a plurality of transducer elements;

summing means, to which each element of said array is connected, for adding the outputs of said transducer elements;

matched filter means comprising delay means connected to said summing means, said delay means having tapped sections which provide as an output the input signal to said delay means with increasing amounts of delay, connections to said tapped sections of said delay means, said connections being arranged in appropriate sets, each set providing signals which, when added, match the response function of said filter means to the impulse response characteristic of the antenna array for a signal wave impinging on said antenna array from a different one of said selectable directions, selective switching means receiving said tapped-section connections as inputs, said switching means permitting the selection of any one of said tapped-section connection sets as desired, and summing means connected to receive the output of said selective switching means;

a second antenna array, summing means and matched filter means identical to the first; and multiplying and integrating means connected to receive as inputs the outputs of said first and second filter means, said filter-means outputs being multiplied and integrated therein to provide a maximum output for the selected beam direction of said antenna arrays.

References Cited by the Examiner

UNITED STATES PATENTS

| 3,074,048 | 1/1963 | Turner | 340—6 X |
| 3,158,830 | 11/1964 | Clay | 343—100.7 |
| 3,161,851 | 12/1964 | Voglis et al. | 343—100.6 |
| 3,206,727 | 9/1965 | Picou | 340—15.5 |

OTHER REFERENCES

Liang et al.: Matched Filter Detector, Geophysics, vol. 27, No. 6, December 1962, pp. 786–795.

Turin: An Introduction to Matched Filters, IRE Trans. on Information Theory, vol. IT–6, No. 3, June 1960, pp. 311–317.

CHESTER L. JUSTUS, *Primary Examiner.*

H. C. WAMSLEY, *Assistant Examiner.*